(12) United States Patent
Teramoto et al.

(10) Patent No.: US 7,532,418 B2
(45) Date of Patent: May 12, 2009

(54) LENS BARREL AND IMAGE PICKUP APPARATUS

(75) Inventors: Tougo Teramoto, Hino (JP); Yoshiharu Takahashi, Tama (JP)

(73) Assignee: Konica Minolta Opto, Inc., Tokyo (JP)

( * ) Notice: Subject to any disclaimer, the term of this patent is extended or adjusted under 35 U.S.C. 154(b) by 148 days.

(21) Appl. No.: 11/594,078

(22) Filed: Nov. 8, 2006

(65) Prior Publication Data
US 2007/0109671 A1 May 17, 2007

(30) Foreign Application Priority Data
Nov. 11, 2005 (JP) ............................. 2005-327271

(51) Int. Cl.
*G02B 7/02* (2006.01)
(52) U.S. Cl. .................... 359/811; 359/813; 359/819; 359/824
(58) Field of Classification Search ................ 359/811, 359/813, 819, 821, 822, 823, 824
See application file for complete search history.

(56) References Cited

U.S. PATENT DOCUMENTS 5,995,300 A * 11/1999 Nishimura et al. .......... 359/699
2005/0109915 A1* 5/2005 Matsui .................... 250/201.5

* cited by examiner

*Primary Examiner*—Ricky L Mack
*Assistant Examiner*—Brandi N Thomas
(74) *Attorney, Agent, or Firm*—Finnegan, Henderson, Farabow, Garrett & Dunner, L.L.P.

(57) ABSTRACT

A lens barrel includes: a plurality of lens groups arranged on an optical axis; and at least one reflection surface arranged on the optical axis for bending the optical axis into a plurality of optical axis segments. Among the optical axis segments, at least two lens groups are arranged on different optical axis segments. The lens barrel further includes a lens drive section including a first driving source, for moving the at least two lens groups along the different optical axis segments respectively by using the first driving source.

8 Claims, 9 Drawing Sheets

FIG. 2 (b)
FIG. 2 (a)
FIG. 2 (c)
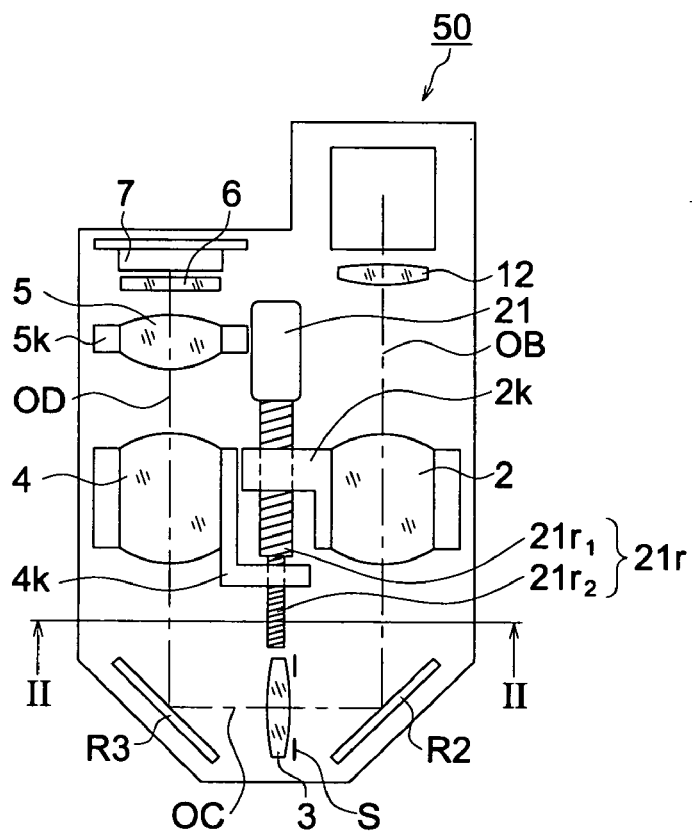
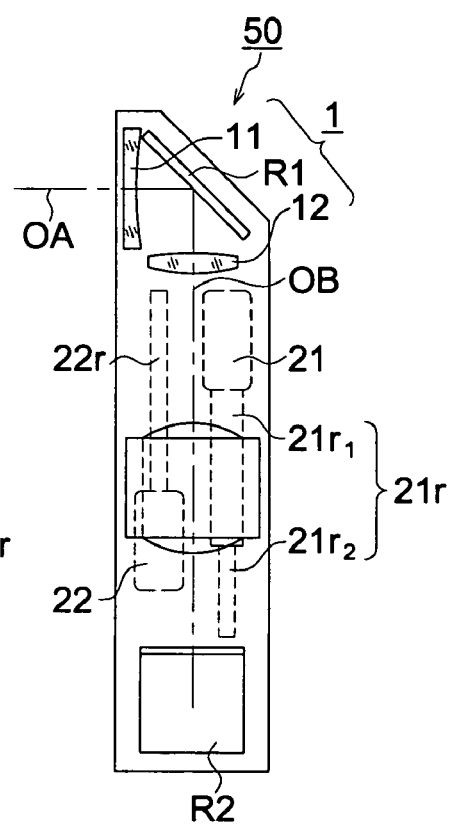
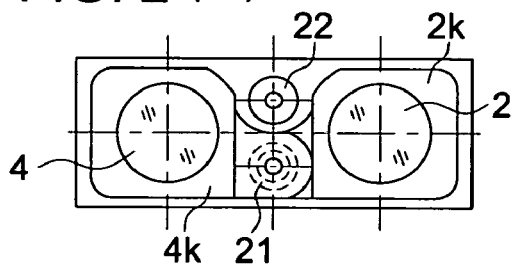

LENS BARREL AND IMAGE PICKUP APPARATUS

This application is based on Japanese Patent Application No. 2005-327271 filed on Nov. 11, 2005, in Japanese Patent Office, the entire content of which is hereby incorporated by reference.

TECHNICAL FIELD

The present invention relates to a lens barrel that includes therein an imaging optical system whose optical axis is bent and has a lens drive device that moves a predefined lens group, and relates to an image pickup apparatus includes the lens barrel.

BACKGROUND

A camera equipped with a zoom lens has so far been on the market. A zoom lens provides a change of a focal length (zooming) by moving a plurality of lens groups constituting an optical system to desired positions along the optical axis, and thereby, by changing their distances.

A method to move lens groups along the optical axis is divided roughly into two types. In one of them, a lens frame is engaged with a straight guide, and a cam cylinder or a helicoid is rotated to move the lens frame straight, and in the other of them, a shaft is arranged to be substantially in parallel with the optical axis to be a guide shaft, then, a frame that engages with the guide shaft is formed on the lens frame, and a motor and a lead screw are used to cause the lens frame directly to slide along the guide shaft for straight movement. As a driving source for moving these lens groups, a DC motor and a stepping motor are generally used.

On the other hand, there is known a so-called bending optical system whose optical axis is bent by a reflection surface arranged in the optical system. In a camera equipped with such an imaging optical system whose optical axis is bent, a lens barrel is not protruded from a front face of the camera in the course of photographing, and a form of the camera is not changed irrespectively of zooming operations, which is an advantageous point.

Even in the case of a camera employing this imaging optical system whose optical axis is bent, its outer shape is required to be small and thin, and an imaging optical system to be housed is required to have higher variable power. However, if the imaging optical system is made to have higher variable power, a tendency toward a greater total length of the optical system is unavoidable.

For the requirements mentioned above, there is a camera whose outer shape is made to be small to house an imaging optical system wherein plural reflection surfaces are arranged, and an optical axis is bent more than once so that the optical axis may not exist on the same plane (for example, see TOKUKAI No. 2004-193848).

A digital camera described in the aforesaid document provides a zoom lens with high variable power which can be housed in a camera with a small outer shape. However, when there is provided a digital camera in which an optical axis is bent more than once into optical axis segments and in which lens groups are arranged to be moved, in the case of zooming, along the respective optical axis segments not forming the same straight line, driving sources arranged for respective lens groups to move the lens groups increase cost and lens barrel size, which is a problem.

SUMMARY

In view of the aforesaid problem, an object of the present invention provides a small-sized lens barrel of a zoom lens (variable power lens) with lower cost constituted so as to bend an optical axis even when lens groups moving for zooming operation in the zoom lens are arranged on line segments of the optical axis not forming one straight line and provides an image pickup apparatus.

An embodiment of the present invention is a lens barrel including: a plurality of lens groups having an optical axis; at least one reflection surface arranged on the optical axis for bending the optical axis into a plurality of optical axis segments in which at least two lens groups are arranged on different optical axis segments; and a lens drive section including a first driving source and for moving the at least two lens groups along the different optical axis segments respectively by using the first driving source.

In the above embodiment, it is preferable that the lens barrel includes a plurality of reflection surfaces arranged on the optical axis for bending the optical axis into the plurality of optical axis segments and the different optical axis segments including the at least two lens groups are arranged substantially parallel to each other, and the first driving source is arranged between the optical axis segments arranged substantially parallel to each other.

It is preferable that the lens barrel further includes a second driving source arranged between the optical axis segments arranged substantially parallel to each other for driving a lens group along the optical axis being different from the lens groups moved by the lens drive section.

In the above embodiment, it is more preferable that the lens barrel further includes a lens frame integrally formed in one body, wherein the at least two lens groups moved by the lens drive section are attached to the lens frame.

In the above embodiment, it is preferable that the lens barrel further includes a cam for moving at least one of the at least two lens groups arranged on the different optical axis segments.

In the above embodiments, it is preferable that the lens barrel is a variable power lens barrel for use in an image pickup apparatus.

Another embodiment of the present invention is an image pickup apparatus including any one of the above described lens barrels.

Embodiments relating to the invention make it possible to obtain a small-sized lens barrel and image pickup apparatus with low cost, even when using an imaging optical system in which lens groups moving for zooming operation are arranged on respective segments of the optical axis not forming one straight line.

These and other objects, features and advantages according to the present invention will become more apparent upon reading of the following detailed description along with the accompanied drawings.

BRIEF DESCRIPTION OF THE DRAWINGS

Embodiments will now be described, by way of example only, with reference to the accompanying drawings which are meant to be exemplary, not limiting, and wherein like elements numbered alike in several Figures, in which.

Figure 3:
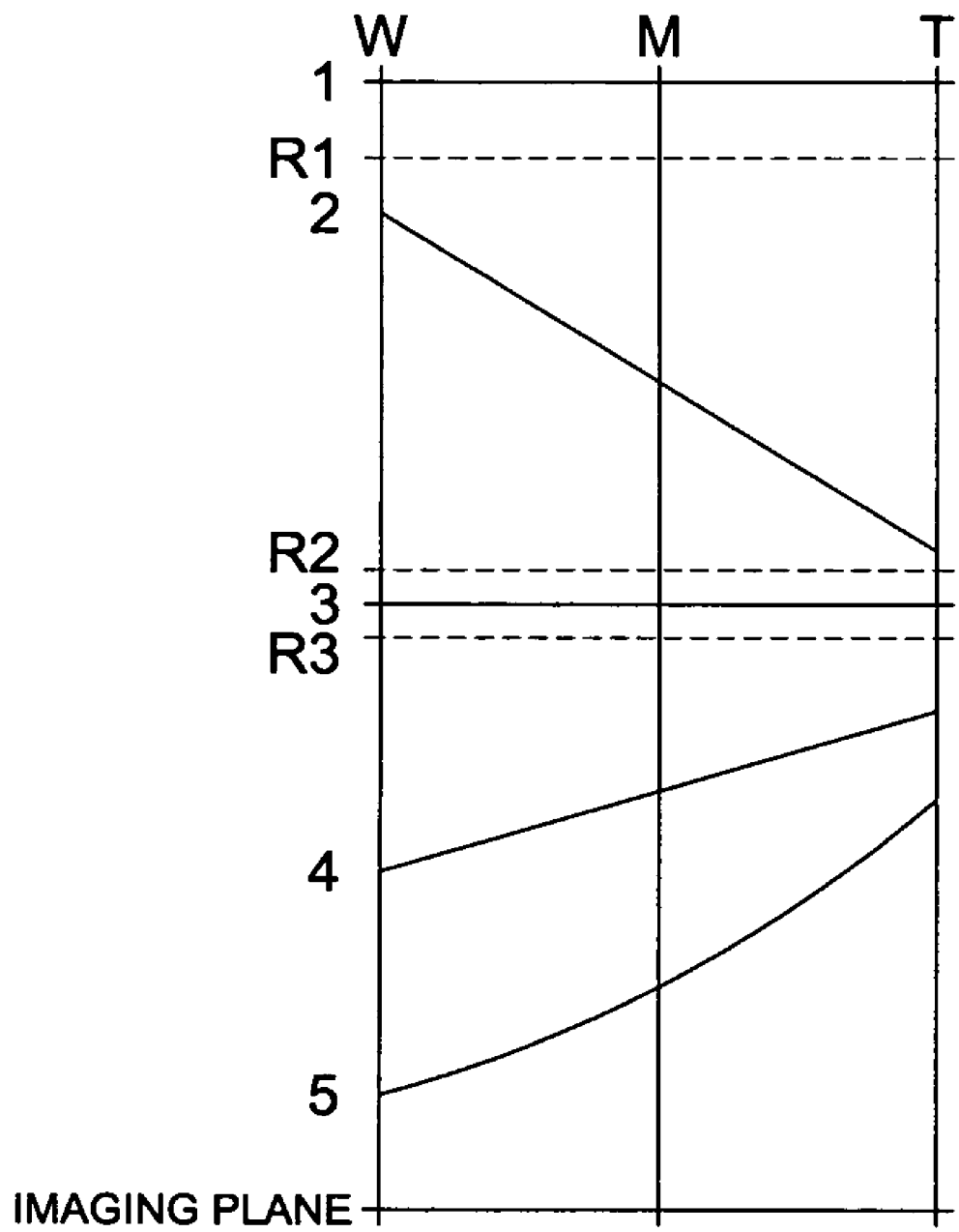
Figure 4:
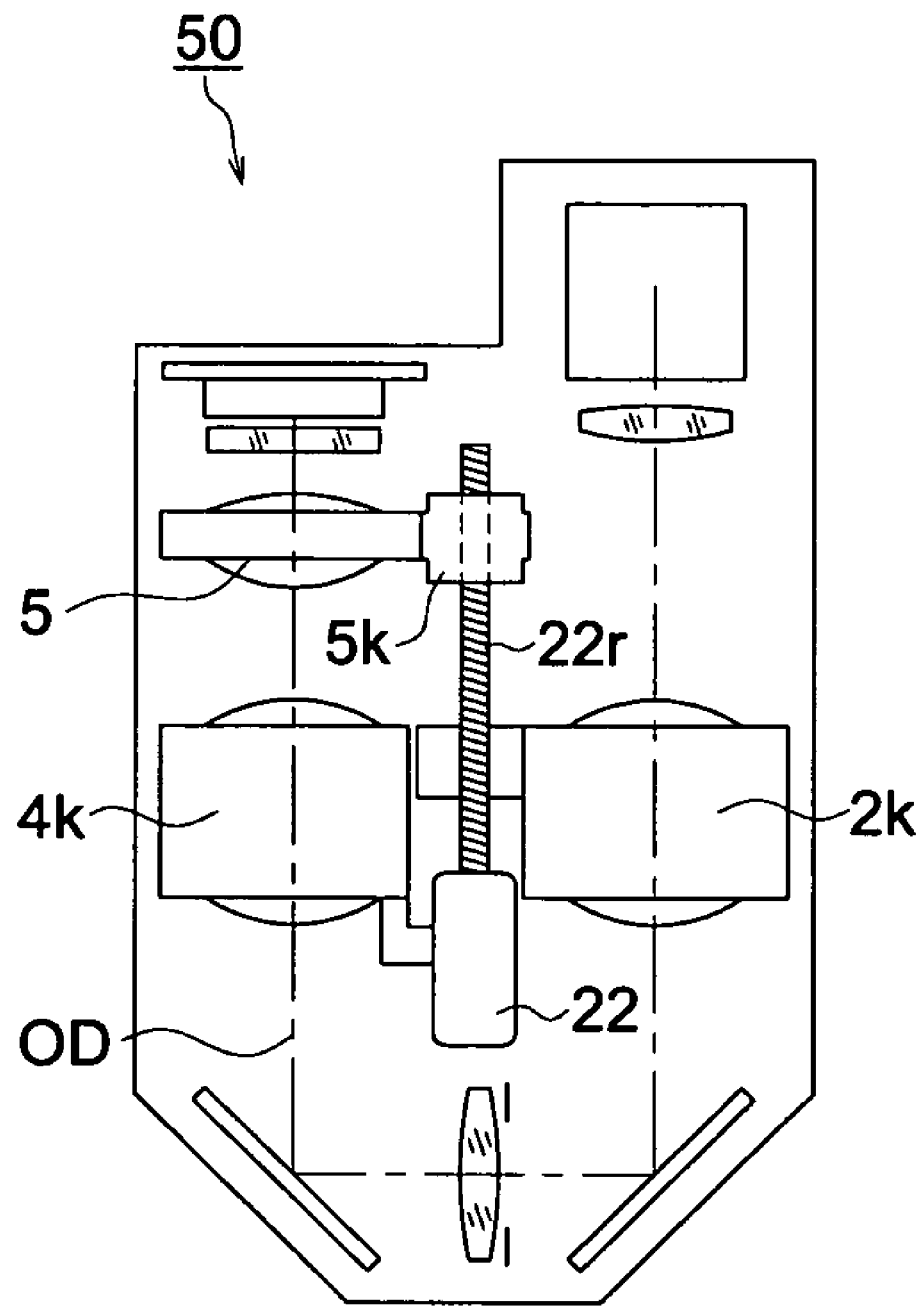
Figure 5:
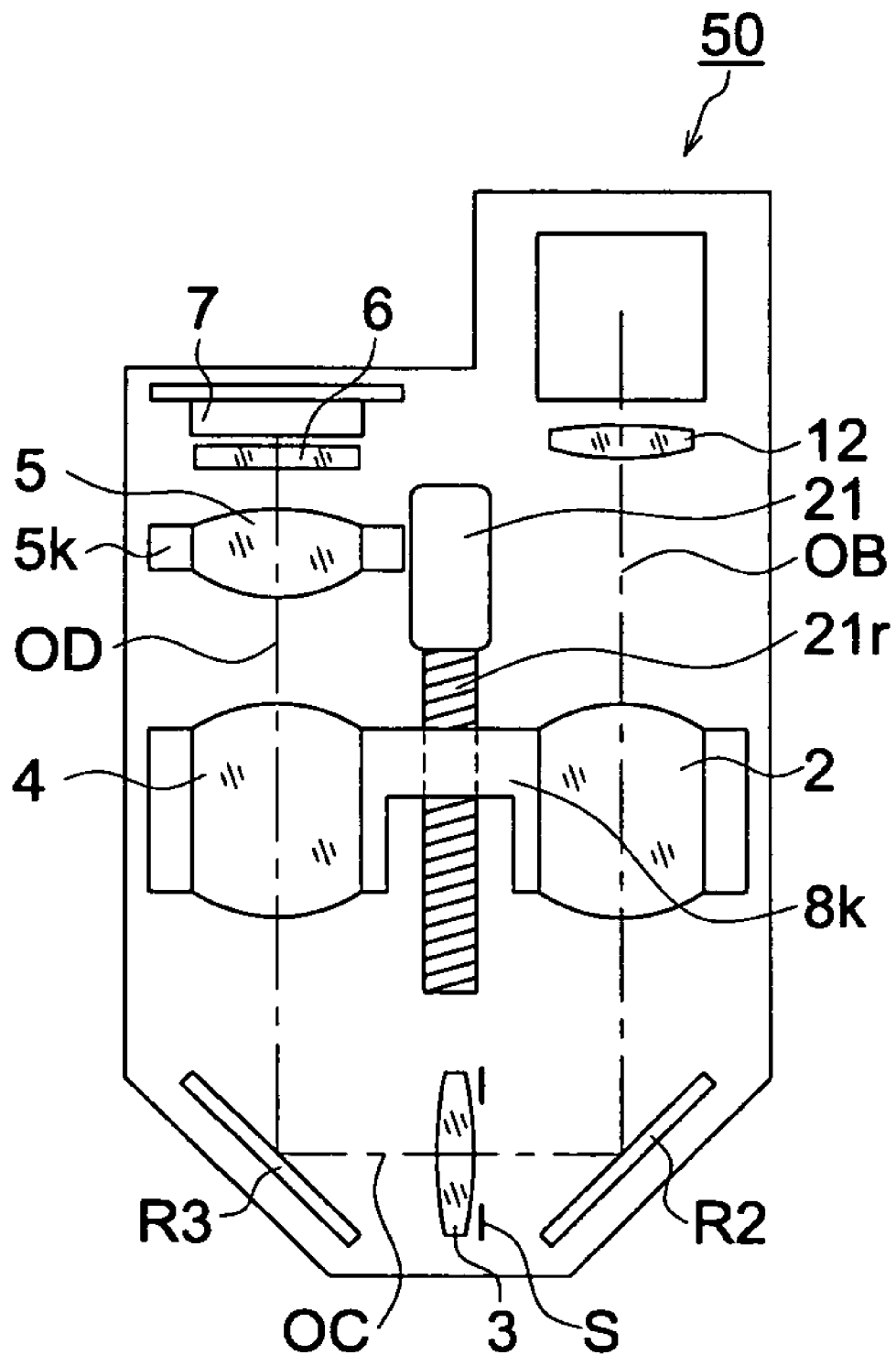
Figure 6:
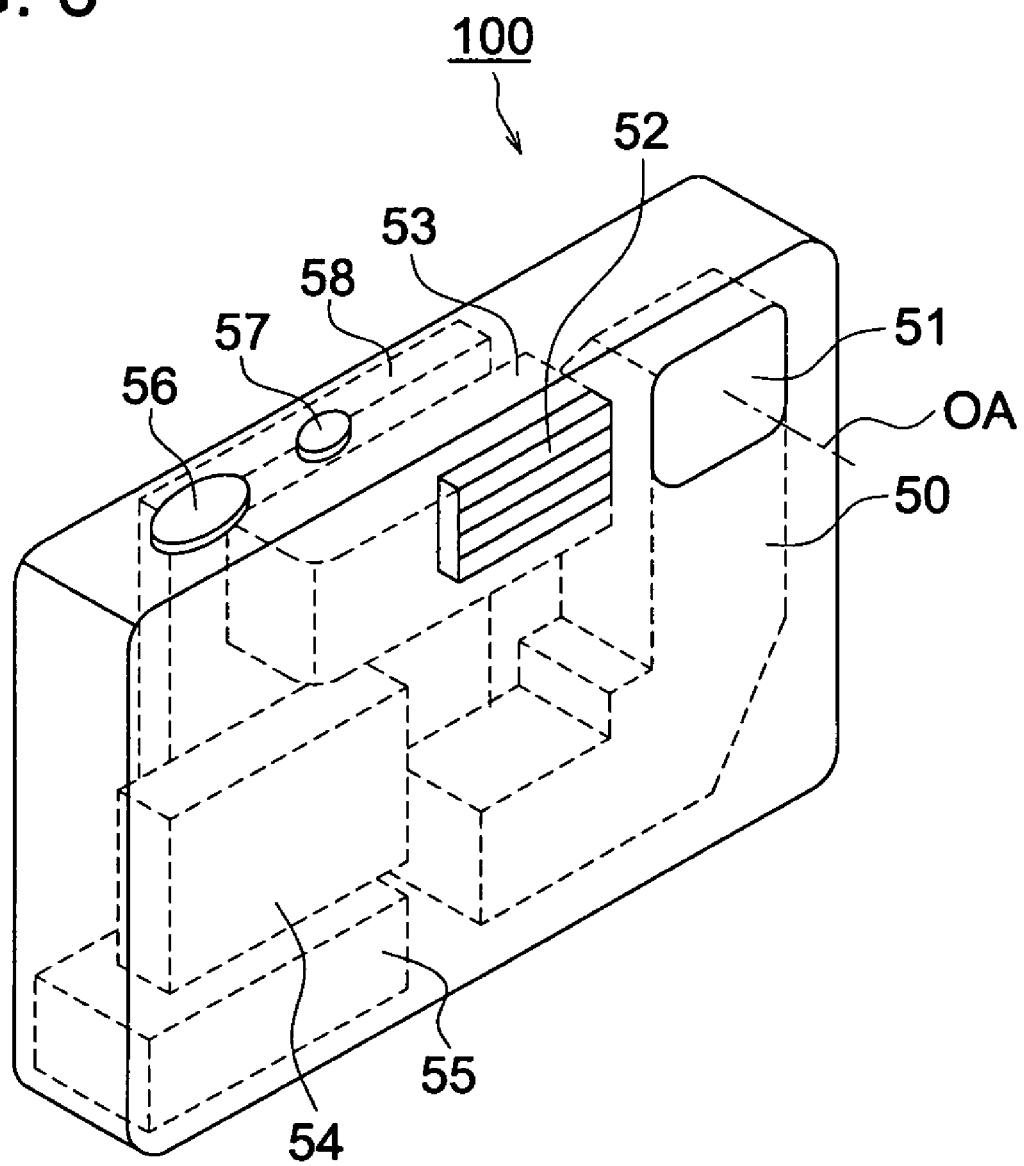
Figure 8:
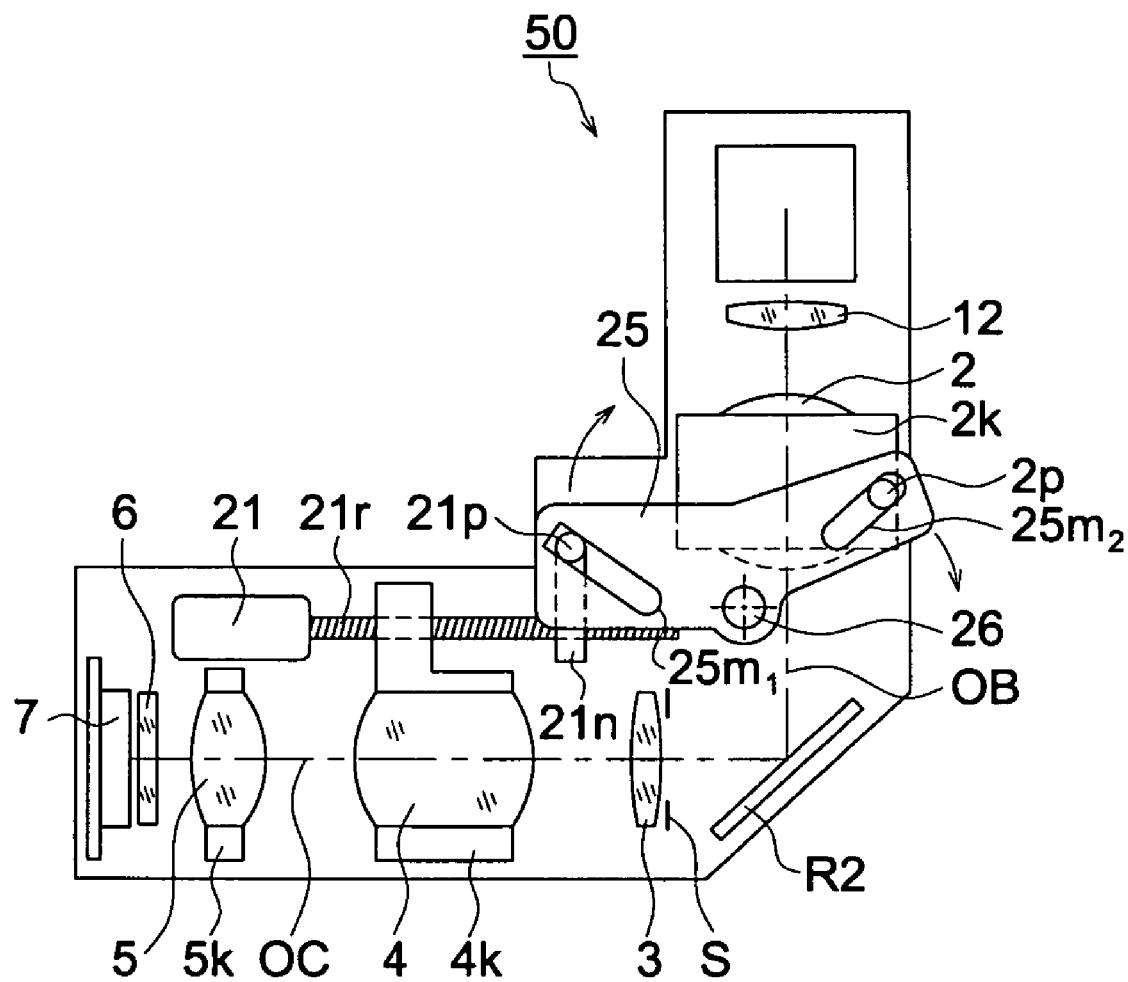
Figure 9:
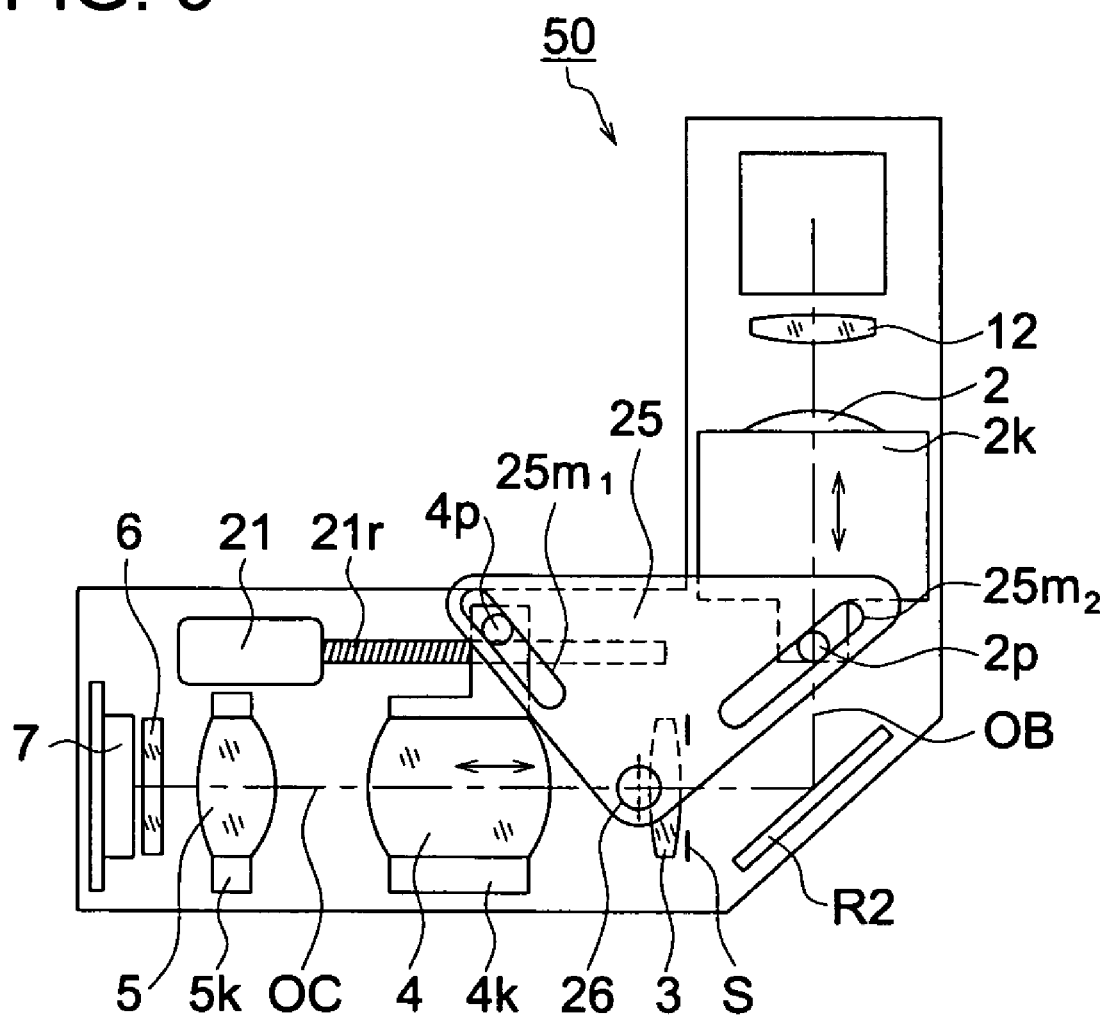

Each of FIGS. 2(a)-2(c) is a pattern diagram showing a bending imaging optical system whose power is variable inside a lens barrel relating to the first embodiment;

FIG. 3 is a diagram showing movement lines of lens groups in the course of zooming;

FIG. 4 is a diagram showing typically the mechanism for moving the fifth lens group in the lens barrel;

FIG. 5 is a diagram showing an example wherein the second lens group frame and the fourth lens group frame which are united in one body in the lens barrel relating to the first embodiment;

FIG. 6 is a diagram showing an example of internal arrangement of a primary structure unit of a camera representing an example of an image pickup apparatus equipped with a lens barrel relating to the second embodiment;

Each of FIGS. 7(a) and 7(b) is a pattern diagram showing a bending imaging optical system whose power is variable inside a lens barrel relating to the second embodiment;

FIG. 8 is a diagram showing another example of a lens barrel relating to the second embodiment; and FIG. 9 is a diagram showing the other example of the lens barrel relating to the second embodiment.

DESCRIPTION OF THE PREFERRED EMBODIMENT

The invention will be explained in detail as follows, referring to embodiments to which, however, such description is for illustrative purposes only, and it is to be understood that changes and variations may be made without departing from the sprit or scope of the appended claims.

First Embodiment

A lens barrel and an image pickup apparatus both relating to the first embodiment will be explained as follows.

Figure 1:
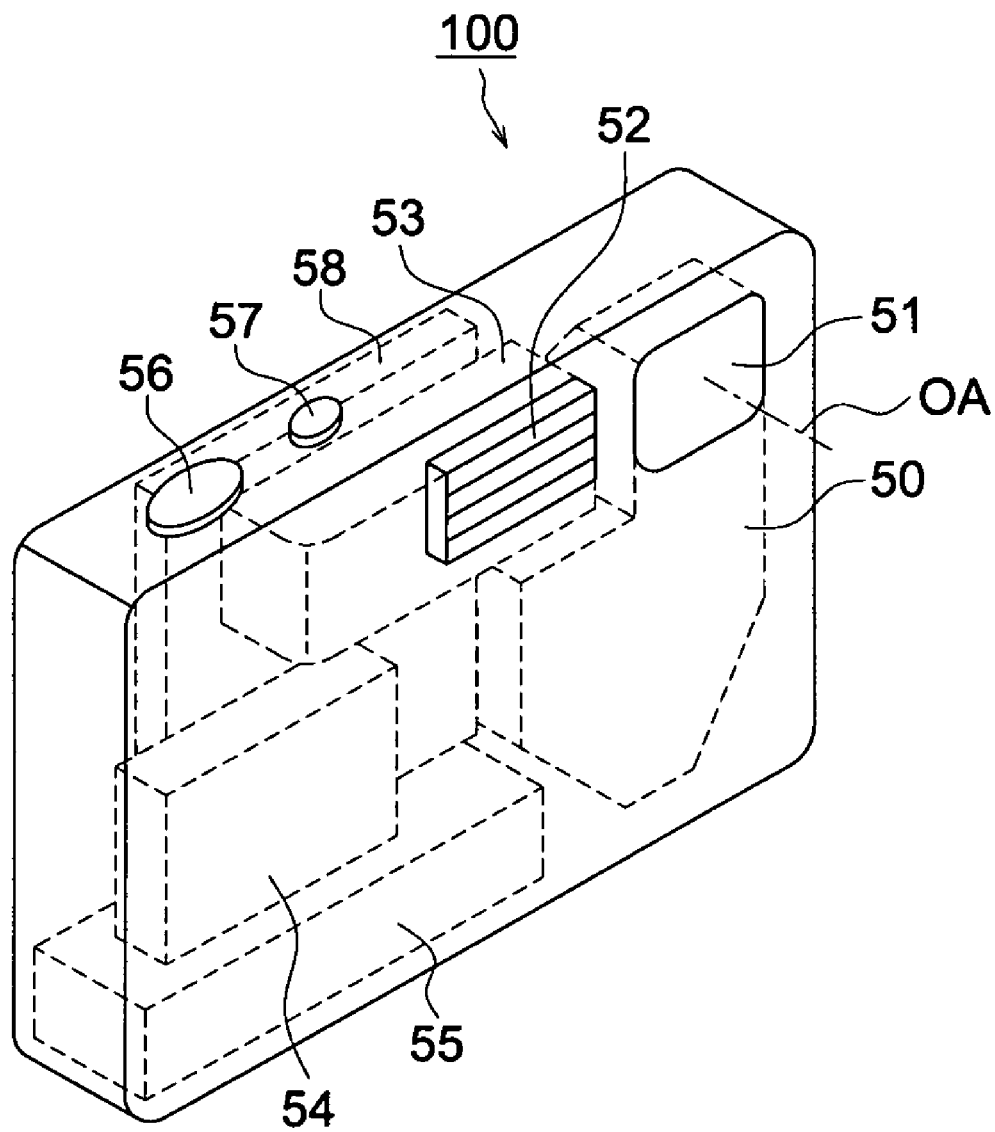
FIG. 1 is a diagram showing an example of internal arrangement of a primary structure unit of a camera representing an example of an image pickup apparatus equipped with a lens barrel relating to the first embodiment.

FIG. 1 is a diagram showing an example of internal arrangement of a primary structure unit of camera 100 representing an example of an image pickup apparatus equipped with a lens barrel relating to the first embodiment. The diagram is a perspective view of camera 100 which is viewed from diagonally above at a photographic object side.

As shown in FIG. 1, camera 100 includes lens barrel 50 housing therein a bending imaging optical system whose power is variable and arranged longitudinally on the right side of the camera and aperture area 51 arranged therein so as to take in a light flux of a photographic object. On the aperture area 51, there is provided an unillustrated lens barrier that creates an open state through which the aperture area 51 is exposed and a closed state that covers the aperture area 51.

FIG. 1 further shows flash emission window 52; and flash unit 53 including a reflective umbrella, a xenon tube, a main capacitor and a circuit board, and arranged behind the flash emission window. FIG. 1 also shows image recording memory 54 of a card type, and battery 55 which supplies power source to each section of the camera. Image recording memory 54 and battery 55 can be mounted in and dismounted from through an unillustrated lid portion.

Shutter release button 56 is arranged on the top surface of the camera, and photographing preparation operations of the camera, namely, operations for focusing and photometry are conducted by the first step push-in of the shutter release button, and photographing exposure operations are conducted by the second step push-in thereof. FIG. 1 shows main switch 57 to switch a camera between the state of working and the state of nonworking. When a camera is switched to the state of working by the main switch 57, an unillustrated lens barrier is caused to be in the open state, and operations of each section are started. When a camera is switched to the state of nonworking by the main switch 57, an unillustrated lens barrier is caused to be in the closed state, and operations of each section are terminated.

On the back surface of the camera, there is arranged image display section 58 that includes LCD or organic EL and displays images and other textual information. Further, there are arranged unillustrated operation members such as a zoom button for zoom-up and zoom-down, a reproduction button to reproduce images taken, a menu button to display various menus on the image display section 58 and a selection button to select desired function from the display.

Meanwhile, between these primary structure units, there is arranged an unillustrated circuit board that connects each sections of the camera and is equipped with various types of electronic parts, so that the primary structure units may be driven and controlled. In the same way, there are provided an external input-output terminal, a strap-attaching mount and a tripod mount which are not illustrated.

Each of FIGS. 2(a) to 2(c) is a pattern diagram showing a bending imaging optical system whose power is variable arranged inside lens barrel 50 relating to the first embodiment. FIG. 2(a) shows a pattern section taken on a plane including optical axis OA through which the ray of a photographic object enters and optical axis OB which is deflected and follows the optical axis OA, while, FIG. 2(b) shows a pattern section taken on a plane including optical axis OB, optical axis OC which is deflected and follows the optical axis OB, and optical axis OD which is deflected and follows the optical axis OC. FIG. 2(c) shows a pattern section taken on line II-II in FIG. 2 (b). Incidentally, in FIGS. 2(a) to 2(c), guide members which guide respective moving lens groups to advance straight are omitted. Further, for avoiding reduplication of the explanation, same symbols are given to members having the same functions in the following diagrams.

Each of FIGS. 2(a) to 2(c) shows first lens 1 group, and the first lens group 1 includes lens 11 which has optical axis OA and is arranged to face a photographic object; reflecting member R1 having a reflection surface; and lens 12. The reflecting member R1 bends the optical axis into a plurality of optical axis segments including the optical axis OA and the optical axis OB which follows the optical axis OA. This first lens group is a lens group that is fixed.

Each of FIGS. 2(a) to 2(c) further shows second lens group 2 which is incorporated in second lens group frame 2k. The second lens group is a lens group that moves together with the second lens group frame 2k as one body in the case of varying power (which is also called zooming).

Behind the second lens group 2, there is arranged reflecting member R2 having a reflection surface, and this reflecting member R2 bends the optical axis into a plurality of optical axis segments including the optical axis OB and the optical axis OC which follows the optical axis OB.

Each of FIGS. 2(a) to 2(c) further shows third lens group 3 which is a fixed lens group and diaphragm shutter unit S.

Behind the third lens group 3, there is arranged reflecting member R3 having a reflection surface, and this reflecting member R3 bends the optical axis into a plurality of optical axis segments including the optical axis OC and the optical axis OD which follows the optical axis OC.

Each of FIGS. 2(a) to 2(c) further shows fourth lens group 4 which is incorporated in fourth lens group frame 4k. The fourth lens group is a lens group that moves together with the fourth lens group frame 4k as one body in the case of varying power.

Each of FIGS. 2(a) to 2(c) further shows fifth lens group 5 which is incorporated in fifth lens group frame 5k. The fifth lens group is a lens group that moves together with the fifth lens group frame 5k as one body in the case of varying power and of focus adjusting (which is also called focusing).

Each of FIGS. 2(a) to 2(c) also shows optical filter 6 wherein an infrared blocking filter and an optical low-pass filter are laminated; and image sensor 7 for which a CCD (Charge Coupled Device) type image sensor and a CMOS (Complementary Metal-Oxide Semiconductor type image sensor are used. The image sensor 7 is connected to an unillustrated flexible print board to be connected to other circuits in the camera.

Each of the second lens group 2, the fourth lens group 4 and the fifth lens group 5 is moved by an amount established therefor respectively toward the third lens group 3 from their respective position in the wide-angle state shown in FIG. 2(b), whereby, zooming is carried out. Further, the fifth lens group 5 is further moved for focusing, from the position where the fifth lens reaches by zooming.

FIG. 3 is a diagram showing movement lines of lens groups in the course of zooming. FIG. 3 shows a movement of each lens group on an explanatory basis in the occasion where a focal length of the imaging optical system is changed within a range from the wide-angle end (W) to the telephoto end (T), and each broken lines show positions of reflection surfaces of reflecting members R1, R2 and R3, respectively, and figures on the y-axis show respective lens groups.

As shown in FIG. 3, the first lens group and the third lens group are fixed lens groups, while, the second, the fourth and the fifth lens groups are moved within a range of wide-angle end (W) and telephoto end (T) to conduct zooming. Meanwhile, the fifth lens group 5 is further moved for focusing, from the position where it reaches by zooming.

Each of FIGS. 2(a)-2(c) also shows first motor 21 and second motor 22. Each of the first motor and the second motor is, for example, a stepping motor connected to an unillustrated print board to be controlled and driven individually.

On the first motor 21, lead screw 21r representing a male screw member is formed on a rotary shaft of the first motor. This lead screw 21r includes first screw groove $21r_1$ and second screw groove $21r_2$ which are formed on a single shaft and are formed so that screws on these grooves advance in the same direction and their pitches are different to each other. This lead screw 21r having the first screw groove $21r_1$ and the second screw groove $21r_2$ may either be provided by separately making lead screws having respective screw grooves and then uniting them together, or by machining a shaft of one body.

The first screw groove $21r_1$ is engaged with a female screw portion formed on the second lens group frame 2k as illustrated, and the second screw groove $21r_2$ is engaged with a female screw portion formed on the fourth lens group frame 4k as illustrated. Alternatively, it is also possible to employ a structure wherein each of the first screw groove $21r_1$ and the second screw groove $21r_2$ are caused to engage with female screw members respectively, and these female members are caused to be connected respectively with the second lens group frame 2k and the fourth lens group frame 4k.

Due to the rotation of the first motor 21 in the prescribed direction, each of the second lens group 2 and the fourth lens group 4 is caused to approach the third lens group 3 by an own amount of movement which is different from each other, and due to the rotation of the first motor 21 in the opposite direction, each of the second lens group 2 and the fourth lens group 4 is caused to be moved to leave the third lens group 3 by an own amount of movement which is different from each other. Owing to this, the second lens group 2 and the fourth lens group 4 can move to follow the movement lines shown in FIG. 3.

Namely, the second lens group 2 and the fourth lens group 4 are respectively moved by the first motor 21 on optical axis OB, and optical axis OD which are formed by bending the optical axis of the first to fifth lens groups by reflection surfaces arranged on the optical axis such that the optical axes OB and OD do not form one straight line. Owing to this, two lens groups can be moved by one motor, which reduces cost of a lens barrel.

Further, when the second lens group 2 and the fourth lens group 4 are moved by using the first motor 21 representing a common driving source so as to change the focal length of the imaging optical system within a range from the wide-angle end (W) to the telephoto end (T), it is preferable the relation between the movement of these two lens groups is linear.

Further, it is preferable that the second lens group 2 and the fourth lens group 4 both moved by using the first motor 21 are arranged respectively on optical axis OB and on optical axis OD which are provided to be substantially parallel each other by bending the optical axis of the first to fifth lens groups using reflecting members R2 and R3 arranged on the optical axis. By making optical axes OB and OD to be substantially parallel by bending the optical axis using reflecting members R2 and R3 arranged on the optical axis, and by arranging the first motor 21 in a space between optical axis OB and optical axis OD, a small-sized lens barrel can be created.

On the other hand, second motor 22 which is a driving source other than the first motor 21 is also arranged in a space between optical axis OB and optical axis OD which are substantially in parallel each other as shown in FIG. 2(c), and moves the fifth lens group 5 following the movement lines shown in FIG. 3. By arranging the first motor 21 and the second motor 22 in a space between optical axis OB and optical axis OD which are substantially in parallel each other as stated above, a lens barrel which is further smaller can be created.

FIG. 4 is a diagram showing typically the mechanism for moving the fifth lens group in lens barrel 50. In FIG. 4, a guide shaft to guide a moving lens group is omitted.

As shown in FIG. 4, on the second motor 22, lead screw 22r representing a male screw member is formed on a rotary shaft of the second motor. This lead screw 22r is engaged with a female screw portion formed on the fifth lens group frame 5k as illustrated. Alternatively, it is also possible to employ the structure wherein the leas screw 22r is engaged with a female screw member, and this female screw member is connected with the fifth lens group frame 5k.

The fifth lens group 5 is moved by the second motor 22 for zooming and further moved for focusing from the position where the fifth lens group reaches by the zooming.

Incidentally, two unillustrated photo-interrupters are provided in the camera, and they are provided for detecting the initial position by detecting positions of switching for attaching and removing of shielding portions formed on either one of the second lens group frame 2k and the fourth lens group frame 4k and on the fifth lens group frame 5k. Under the reference of this initial position, the respective directions of rotation and respective amounts of rotation for the first and the second motors are controlled independently, and thereby, a position of each lens group is controlled. Alternatively, detection of the initial position of each lens group frame may also be conducted by a photo-reflector.

The first embodiment stated above is explained using an example providing the first screw groove $21r_1$ and the second screw groove $21r_2$ which are formed so that screws on these grooves advance in the same direction and their pitches are different to each other. However, it should be noted that it is to be understood that other embodiments of this invention may have the structure formed so that each advancing direction of the screws on these grooves is different from each other and their pitches are also different from each other or the structure formed so that each advancing direction of the screws on these grooves is the same to each other and their pitches are also the same to each other. These are to be selected properly based on specifications of the imaging optical system to be used. When each advancing direction of the screws on these grooves is the same to each other and their pitches are also the same to each other, it is also possible to integrally form by uniting the second lens group frame 2k and the fourth lens group frame 4k as one body.

FIG. 5 is a diagram showing an example wherein the second lens group frame and the fourth lens group frame which are in the lens barrel 50 relating to the first embodiment are integrally formed as one body.

As shown in FIG. 5, the second lens group 2 and the fourth lens group 4 are fixed on lens frame 8k formed as one body. The lens frame 8k is engaged with lead screw 21r of the first motor 21 as illustrated, whereby, the second lens group 2 is moved along optical axis OB and the fourth lens group 4 is moved along optical axis OD when lead screw 21r driven by the first motor 21 rotates. In this case, an amount of movement of the second lens group is the same as that of the fourth lens group, for the rotation of lead screw 21r. Incidentally, a movement of the fifth lens group frame 5k is the same as that shown in FIG. 4.

Owing to the structure wherein the two lens groups are incorporated in the lens frame which is integrally formed in one body, so that they are moved by single lead screw 21r as stated above, it has become possible to obtain a lower cost lens barrel.

Second Embodiment

A lens barrel and an image pickup apparatus relating to the second embodiment will be explained as follows.

FIG. 6 is a diagram showing an example of internal arrangement of a primary structure unit of camera 100 representing an example of an image pickup apparatus equipped with a lens barrel relating to the second embodiment. FIG. 6 is a perspective view of camera 100 which is viewed from diagonally above at a photographic object side. With respect to FIG. 6, only portions which are different from those shown in FIG. 1 will be explained.

Lens barrel 50 relating to the second embodiment is L-shaped structure as a whole wherein optical axis OA extending toward a photographic object is first deflected downward along the side surface of the camera 100 illustrated, and then, deflected again horizontally at the bottom surface.

Each of FIGS. 7(a) and 7(b) is a pattern diagram showing a bending imaging optical system whose power is variable arranged inside lens barrel 50 relating to the second embodiment. FIG. 7(a) shows a pattern partial section at the incident portion for light of a photographic object taken on a plane including optical axis OA through which the ray of a photographic object enters and optical axis OB which is deflected and follows the optical axis OA, while, FIG. 7(b) shows a pattern section taken on a plane including optical axis OB and optical axis OC which is deflected and follows the optical axis OB. Incidentally, even in the present example, guide members which guide respective moving lens groups to advance straight are omitted.

Figure 7:
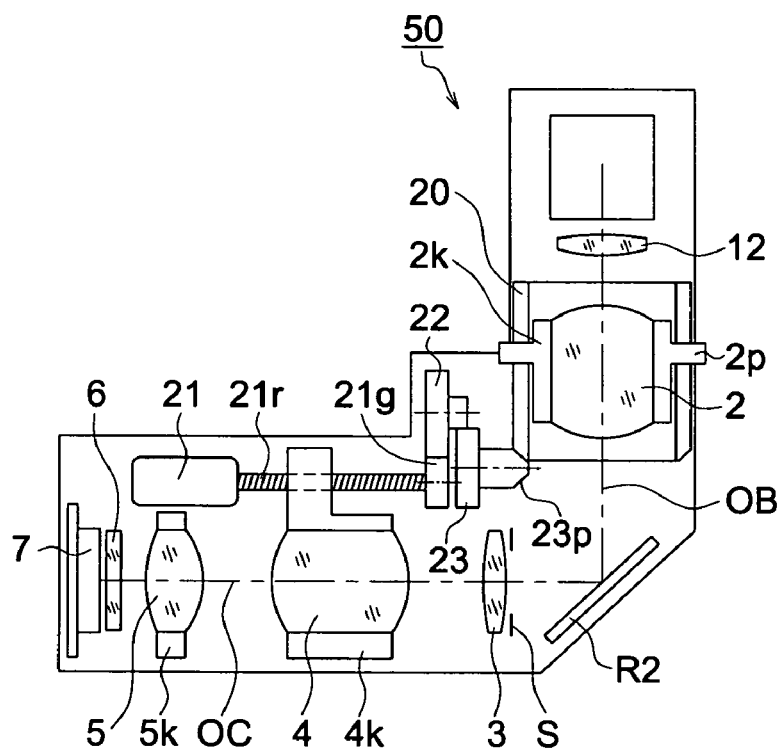

With respect to the imaging optical system shown in FIG. 7, the first lens group 1 and the third lens group 3 are fixed lens groups, while, the second, the fourth and the fifth lens groups are moved within a range from wide-angle end (W) to telephoto end (T) to conduct zooming. Meanwhile, the fifth lens group 5 is further moved, for focusing, from the position where it reaches by zooming.

As shown in FIG. 7, cam pins 2p are integrally formed in one body at an interval of about 120° on the outer circumferential surface of the second lens group frame 2k, and there is provided cam cylinder 20 on which cam grooves engaging with the cam pins 2p are formed. The cam cylinder 20 is supported rotatably, and the second lens group frame 2k can move straight in the direction of optical axis OB while being guided by an unillustrated guide member that guides straight when the cam cylinder 20 rotates.

A female screw portion formed on the fourth lens group frame 4k is engaged with lead screw 21r to be subjected to unillustrated rotation-locking, and a rotation of the first motor 21, namely, a rotation of the lead screw 21r causes the fourth lens group frame 4k, namely, the fourth lens group 4 to move in the direction of optical axis OC.

The first motor 21 is provided with lead screw 21r engaging with the fourth lens group frame 4k and with gear portion 21g formed as one body with the lead screw 21r. A rotation of the gear portion 21g is reduced in terms of speed by decelerating gears 22 and 23, and it causes bevel gear 23p formed to be on a coaxial basis with decelerating gear 23 to rotate. Cam cylinder 20 on which a bevel gear portion engaging with bevel gear 23p is formed is rotated by a rotation of the bevel gear 23p, and the second lens group frame 2k moves straight in the direction of optical axis OB.

Namely, the first motor 21 representing a common drive source is rotary driven for moving the second lens group 2 and the fourth lens group 4 positioned on optical axis OB and optical axis OC respectively which are formed by bending the optical axis of the first to fifth lens groups by reflecting member R2 arranged on the optical axis. By moving either one of two lens groups with a cam as in the present example, a change in amounts of movement of lens groups moved by a cam can be established freely, and a degree of freedom for lens design can be increased.

For example, by designing a shape of a cam groove properly, it is possible to move the second lens group 2 and the fourth lens group 4 with the first motor 21 representing a common drive source, under the linear relation or under the nonlinear relation.

In the mean time, the fifth lens group 5 is moved by an unillustrated second motor for zooming and focusing by additionally moving from a position where the fifth lens reaches by the zooming operation.

FIG. 8 is a diagram showing another example of lens barrel 50 relating to the second embodiment. FIG. 8 shows an example wherein the second lens group frame 2k is moved by cam member 25. Meanwhile, even in the present example, guide members which guide respective moving lens groups to advance straight are omitted. Concerning lens barrel 50 shown in FIG. 8, only portions thereof which are different from those in FIG. 6 will be explained.

As shown in FIG. 8, lead screw 21r of the first motor 21 is engaged with nut 21n which is subjected to unillustrated rotation-locking, and a rotation of lead screw 21r creates straight movement in the direction of optical axis OC. Pin 21p is formed on the nut 21n. Further, pin 2p is formed on the second lend group frame 2k.

FIG. 8 shows a plate-like cam member 25 (which is also called a bell-crank), and a shaft 26. The bell-crank 25 is supported rotatably around the shaft 26. On the bell-crank 25, there are formed elongated groove $25m_1$ that engages with pin 21p and elongated groove $25m_2$ that engages with pin 2p.

When lead screw 21r is rotated by the first motor 21 and when the fourth lens group frame 4k on optical axis OC is moved to approach the third lens group accordingly, nut 21n is also moved to the right side on the page space. With this movement of nut 21n toward the right side in the illustration, the bell-crank 25 rotates around the shaft 26 clockwise as shown with an arrow in FIG. 8 to move pin 2p engaging with elongated groove $25m_2$ toward reflecting member R2 and to move the second lens group frame 2k in the direction to approach the third lens group 3 along an unillustrated guide member.

On the other hand, when lead screw 21r is rotated in the inverse direction under the condition that the aforesaid second lens group 2 and fourth lens group 4 are close to the third lens group, the fourth lens group frame 4k on optical axis OC moves in the direction to leave the third lens group, and nut 21n also moves toward the left side on the page space. With this movement of nut 21n toward the left side in the illustration, the bell-crank 25 rotates around the shaft 26 counterclockwise opposite to the arrow in the diagram, which can move pin 2p engaging with elongated groove $25m_2$ toward the first lens group 1 and can move the second lens group frame 2k in the direction to leave the third lens group 3 along an unillustrated guide member.

As stated above, when a plate-like cam member driven by the first motor 21 is used for moving either one of two lens groups positioned respectively on optical axis segments formed by bending the optical axis into a plurality of optical axis segments by a reflection surface on the optical axis such that the optical axis segments including the moved lens groups do not form the same straight line, it provides a lens barrel that is lower in terms of cost than the lens barrel shown in FIGS. 7(a) and 7(b), while acquiring the same effects as in the lens barrel shown in FIGS. 7(a) and 7(b).

FIG. 9 is a diagram showing another example of lens barrel 50 relating to the second embodiment. FIG. 9 also shows an example wherein the second lens group frame 2k is moved by a plate-like cam member. Meanwhile, in this example, again, a guide member that guides each moving lens group for its straight advancement is omitted. For the lens barrel 50 shown in FIG. 9, only portions thereof which are different from those shown in FIG. 8 will be explained.

As shown in FIG. 9. pin 4p is integrally formed on the fourth lens group frame 4k in one body.

FIG. 9 shows a bell-crank 25, and a shaft 26. The bell-crank 25 is supported rotatably around the shaft 26. On the bell-crank 25, there are formed elongated groove $25m_1$ that engages with pin 4p and elongated groove $25m_2$ that engages with pin 2p.

When lead screw 21r is rotated by the first motor 21 and when the fourth lens group frame 4k on optical axis OC is moved to approach the third lens group accordingly, the bell-crank 25 is rotated around the shaft 26 clockwise by pin 4p formed integrally on the fourth lens group frame 4k as one body to move pin 2p engaging with elongated groove $25m_2$, and the second lens group frame 2k is moved in the direction to approach the third lens group along an unillustrated guide member.

On the other hand, when lead screw 21r is rotated in the inverse direction under the condition that the aforesaid second lens group 2 and fourth lens group 4 are close to the third lens group, the fourth lens group frame 4k on optical axis OC moves in the direction to leave the third lens group, and pin 4p also moves toward the left side on the page space. With this movement of pin 4p toward the left side in the page space, the bell-crank 25 rotates around the shaft 26 counterclockwise, which can move pin 2p engaging with elongated groove $25m_2$ toward the first lens group 1 and can move the second lens group frame 2k in the direction to leave the third lens group 3 along an unillustrated guide member.

By doing the foregoing, it is possible to reduce the number of parts to be less than the lens barrel shown in FIG. 8 and to obtain a lens barrel of lower cost, while acquiring the same effects.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

In the second embodiment stated above, the explanation was given with an example that the second lens group frame 2k is moved by using a cam and the fourth lens group frame 4k is caused to engage with lead screw 21r to be moved. However, it is naturally understood that there may be provided another example that the second lens group frame 2k is moved by causing it to be engaged with lead screw 21r and the fourth lens group frame 4k is moved by using a cam.

Further, the structure to move a lens group on one side by using a cam explained in the second embodiment can naturally be applied to the occasion where optical axes are substantially in parallel each other, shown in FIGS. 2(a) to 2(c).

Though the explanation was given referring to the example wherein a plane mirror is used as a reflecting member, in the aforesaid first and second embodiments, a prism or the like can naturally be used properly. It is further possible to employ the structure wherein two lens groups driven by a single drive source are moved by cams.

What is claimed is:

1. A lens barrel for an image pickup apparatus in which a light flux from an object is guided to an image sensor, the lens barrel comprising:
    an optical system which guides the light flux from the object along an optical axis by bending the light flux back toward the image sensor, the optical system comprising:
    a plurality of lens groups arranged on the optical axis and including at least two movable lens groups;
    at least two reflection surfaces arranged on the optical axis for bending the optical axis into a plurality of optical axis segments, wherein the at least two movable lens groups are arranged on different optical axis segments which do not both extend along a single straight line; and
    a lens drive section including a first driving source for moving the at least two movable lens groups along the different optical axis segments, respectively, by using the first driving source.

2. The lens barrel of claim 1,
    wherein the different optical axis segments are arranged substantially parallel to each other, and
    the lens drive section further comprises a rotary shaft arranged parallel to the different optical axis segments and configured to move the at least two movable lens groups along the rotary shaft by using the first driving source.

3. The lens barrel of claim 1, further comprising a second driving source arranged between the different optical axis segments for driving a lens group in the plurality of lens groups being different from the at least two movable lens groups moved by the first driving source of the lens drive section.

4. The lens barrel of claim 2, further comprising a lens frame integrally formed in one body, wherein the at least two movable lens groups moved by the lens drive section are attached to the lens frame and the lens drive section moves the lens frame by using the first driving source.

5. The lens barrel of claim 1, further comprising a cam for moving at least one of the at least two movable lens groups arranged on the different optical axis segments.

6. The lens barrel of claim 1,
wherein the lens barrel is a variable power lens barrel for use in an image pickup apparatus.

7. An image pickup apparatus for taking an image of an object, the image pickup apparatus comprising: the lens barrel of claim 1.

8. The lens barrel of claim 2,
wherein the rotary shaft is arranged between the different optical axis segments.

* * * * *